United States Patent
Masuya

(10) Patent No.: US 7,114,604 B2
(45) Date of Patent: Oct. 3, 2006

(54) TORQUE CONVERTER

(75) Inventor: Kouichi Masuya, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 68 days.

(21) Appl. No.: 11/013,915

(22) Filed: Dec. 17, 2004

(65) Prior Publication Data

US 2005/0133328 A1 Jun. 23, 2005

(30) Foreign Application Priority Data

Dec. 18, 2003 (JP) .............................. 2003-420502

(51) Int. Cl.
*F16H 45/02* (2006.01)
(52) U.S. Cl. ...................... 192/3.29; 192/3.3
(58) Field of Classification Search ............... 192/3.29, 192/3.3
See application file for complete search history.

(56) References Cited

U.S. PATENT DOCUMENTS

| | | | | |
|---|---|---|---|---|
| 5,020,646 A | * | 6/1991 | Koshimo | 192/3.25 |
| 5,129,493 A | * | 7/1992 | Edmunds | 192/3.29 |
| 5,533,602 A | * | 7/1996 | Worner et al. | 192/3.29 |
| 5,789,823 A | * | 8/1998 | Sherman | 290/47 |
| 6,258,001 B1 | * | 7/2001 | Wakuta et al. | 475/5 |
| 6,478,101 B1 | * | 11/2002 | Taniguchi et al. | 180/65.2 |
| 2001/0013731 A1 | * | 8/2001 | Shinohara et al. | 310/85 |

FOREIGN PATENT DOCUMENTS

| | | | |
|---|---|---|---|
| JP | 53011267 A | * | 2/1978 |
| JP | 2001-116110 | | 4/2001 |
| JP | 2002-195376 | | 7/2002 |

OTHER PUBLICATIONS

Copending U.S. Appl. No. 11/036,355, filed Jan. 18, 2005 entitled Torque Converter.

* cited by examiner

*Primary Examiner*—Richard M. Lorence
(74) *Attorney, Agent, or Firm*—Smith, Gambrell & Russell, LLP

(57) ABSTRACT

A torque converter which can prevent an engagement pressure of a lockup clutch from becoming very high. A converter chamber is formed between an outer disc portion of a front cover and an impeller shell. A partition wall separating a clutch chamber and a converter chamber is provided in the outer disc portion. A clutch chamber has a drive plate serving as an input side of an engine output, a driven plate serving as an output side, and a lockup piston forming an engagement oil chamber along with an inner disc portion of the front cover. Since the partition wall is provided, the lockup clutch can be engaged without being affected by the hydraulic pressure within the converter chamber.

8 Claims, 5 Drawing Sheets

TORQUE CONVERTER

BACKGROUND OF THE INVENTION

The present invention relates to a torque converter to which a hydraulically actuated lockup clutch is attached.

The torque converter includes an impeller shell which is mounted to a front cover linked to an engine output shaft and is provided with a pump impeller, and a turbine runner connected to a main shaft so as to be opposed to the pump impeller, and serves as a power transmission apparatus amplifying an engine output and transmitting thereof to the main shaft serving as an output shaft of the torque converter. Since the torque converter transmits the engine output by using fluid, i.e., oil as a medium, a power transmission loss caused by a slip of the fluid is unavoidable. Accordingly, in a range in which a rotational speed difference between the pump impeller and the turbine runner is small, the engine output shaft and the main shaft are set in a directly coupled state by actuating the lockup clutch so that the engine output is directly transmitted to the main shaft.

The lockup clutch is connected to the main shaft, and is actuated to an engagement state, in which the lockup clutch is engaged with a front cover, i.e., a converter cover to directly connect the engine output shaft to the main shaft via the front cover, and a disengagement state, in which the engagement is cancelled. The operation of the lockup clutch is controlled by utilizing the oil that is a power transmitting medium. In other words, the operation of the lockup clutch is controlled by utilizing a pressure difference between the oil supplied into a hydraulic chamber formed between the converter cover and the lockup clutch, and the oil supplied into a converter chamber accommodating the turbine runner.

Such a torque converter that a multiple disc clutch is used as the lockup clutch has been known. For example, in a technique disclosed in Patent Document 1 (Japanese Patent Laid-open No. 2001-116110), the lockup clutch serving as the multiple disc clutch and a lockup piston for engaging the lockup clutch are arranged in the lockup chamber communicating with the converter chamber. The lockup piston is constantly pressed in a direction of canceling the engagement of the lockup clutch due to the hydraulic pressure of the oil flowing in the lockup chamber. However, in the region in which the above-mentioned rotational speed is small, the lockup piston can be operated in the direction of engaging the lockup clutch by supplying the oil into the hydraulic chamber formed between the converter cover and the lockup piston.

The above lockup clutch is also mounted on a hybrid vehicle using, as a power source of a vehicle, an internal combustion engine such as a gasoline engine together with an electric motor. As an example, in a technique disclosed in Patent Document 2 (Japanese Patent Laid-open No. 2002-195376), the lockup clutch is arranged between a damper and an inner peripheral wall of the converter cover.

As mentioned above, the conventional lockup clutch actuated by the hydraulic pressure is formed so as to be open to an inside of the converter chamber in which the torque is amplified, and is always affected by the hydraulic pressure within the converter chamber. Accordingly, in the techniques disclosed in the Patent Documents 1 and 2, since the hydraulic pressure within the converter chamber is applied as a reaction force to a pushing force of the lockup piston in engaging the lockup clutch, it is necessary to make an engagement hydraulic pressure high or increase a pressure receiving area of the lockup piston to which the engagement hydraulic pressure is applied for ensuring a predetermined engaging force. If the engagement hydraulic pressure is made high, a load of the oil pump is increased, so that this is undesirable in view of improving a transmission efficiency. In the techniques disclosed in the above Patent Documents 1 and 2, so the clutches have such a structure that the small-diameter multiple disc clutch is arranged at a comparatively far position from the main shaft and the pressure receiving area of the lockup piston is enlarged.

SUMMARY OF THE INVENTION

Meanwhile, if a whole of a lockup clutch can be downsized without reducing a power transmission capacity, it is possible to form a power transmission apparatus more compactly or to compactly locate a power generation motor constituting a hybrid system in an empty space. However, if a lockup piston is downsized, it becomes difficult to ensure a pressure receiving area for obtaining a predetermined engagement force.

An object of the present invention is to provide a torque converter, which can obtain the predetermined engagement force without making the engagement hydraulic pressure high even if the pressure receiving area of the lockup piston is reduced depending on downsizing of the lockup clutch.

A torque converter according to the present invention, which has an impeller shell provided with a pump impeller and driven by an engine output shaft, and a turbine runner linked to a hollow main shaft so as to be opposed to the pump impeller, an engine output being amplified and transmitted to the main shaft, comprises:

a front cover having an inner disc portion to which the engine output shaft is mounted, a tubular drum portion extending axially from the inner disc portion toward the pump impeller, and an outer disc portion extending radially from the drum portion and forming a converter chamber along with the impeller shell;

a clutch hub connected to the main shaft and to which a driven plate engaged with a drive plate attached to the drum portion is attached;

a lockup piston movably attached axially to an inside of the drum portion and forming an engagement oil chamber along with the inner disc portion; and a partition wall provided in said outer disc portion and sectioning the converter chamber and a clutch chamber for accommodating the drive plate and said driven plate.

In the torque converter according to the present invention, a lubricating oil passage communicating with the clutch chamber and a lockup oil passage communicating with the engagement oil passage are formed in the main shaft.

In the torque converter according to the present invention, an orifice communicating with the clutch chamber and said converter chamber is formed in the partition wall.

In the torque converter according to the present invention, an oil supply passage supplying lubricating oil to the clutch chamber and a discharge passage discharging the lubricating oil within the clutch chamber are formed in the main shaft.

In the torque converter according to the present invention, the front cover is formed by welding a member forming the partition wall and the outer disc portion, and a member forming said inner disc portion and the drum portion.

In the torque converter according to the present invention, an electric motor having a rotor linked by the engine output shaft is arranged outside the drum portion.

According to the present invention, by being sectioned between the converter chamber and the clutch chamber accommodating the lockup clutch, it is possible to exclude an influence of the hydraulic pressure in the converter chamber on the clutch chamber. Accordingly, even if the pressure receiving area of the lockup piston is reduced depending on the downsizing of the lockup clutch, a predetermined engagement force can be ensured with respect to the lockup piston without making the engagement hydraulic pressure high.

Further, according to the present invention, the empty space can be ensured in the outer periphery of the drum portion by downsizing the lockup clutch and accommodating it in the front cover having the inner disc portion, the drum portion, and the outer disc portion.

In addition, since the lubricating oil passage communicating with the clutch chamber and the lockup oil passage communicating with the engagement oil chamber are formed inside the main shaft, the hydraulic pressures supplied to the respective oil chambers can be individually set. Further, it is possible to prevent a centrifugal hydraulic pressure from being generated in the engagement oil chamber due to the lubricating oil within the clutch chamber.

Furthermore, since the orifice is provided in the partition wall sectioning the clutch chamber and the converter chamber, it is possible to enhance circularity of the oil in the clutch chamber and improve efficiency of lubricating and cooling the inside of the clutch chamber.

Additionally, since the two lubricating oil passages communicate with each other independently in the clutch chamber, it is possible to enhance the circularity of the oil in the clutch chamber and improve efficiency of lubricating and cooling the inside of the clutch chamber.

And, since the member for forming the partition wall and the outer disc portion and the member for forming the inner disc portion and the drum portion are welded to form the front cover, the portion of the front cover and the lockup clutch are modularized so as to form the external mounting structure. Therefore, the outward protruding amount of the torque converter can be easily changed.

Since the electric motor having the rotor linked by the engine output shaft is arranged outside the drum portion, it is possible to achieve the downsizing of the power transmission apparatus including the torque converter and the electric motor.

DESCRIPTION OF THE PREFERRED EMBODIMENTS

Hereinafter, embodiments of the present invention will be detailed on the basis of the accompanying drawings.

Figure 1:
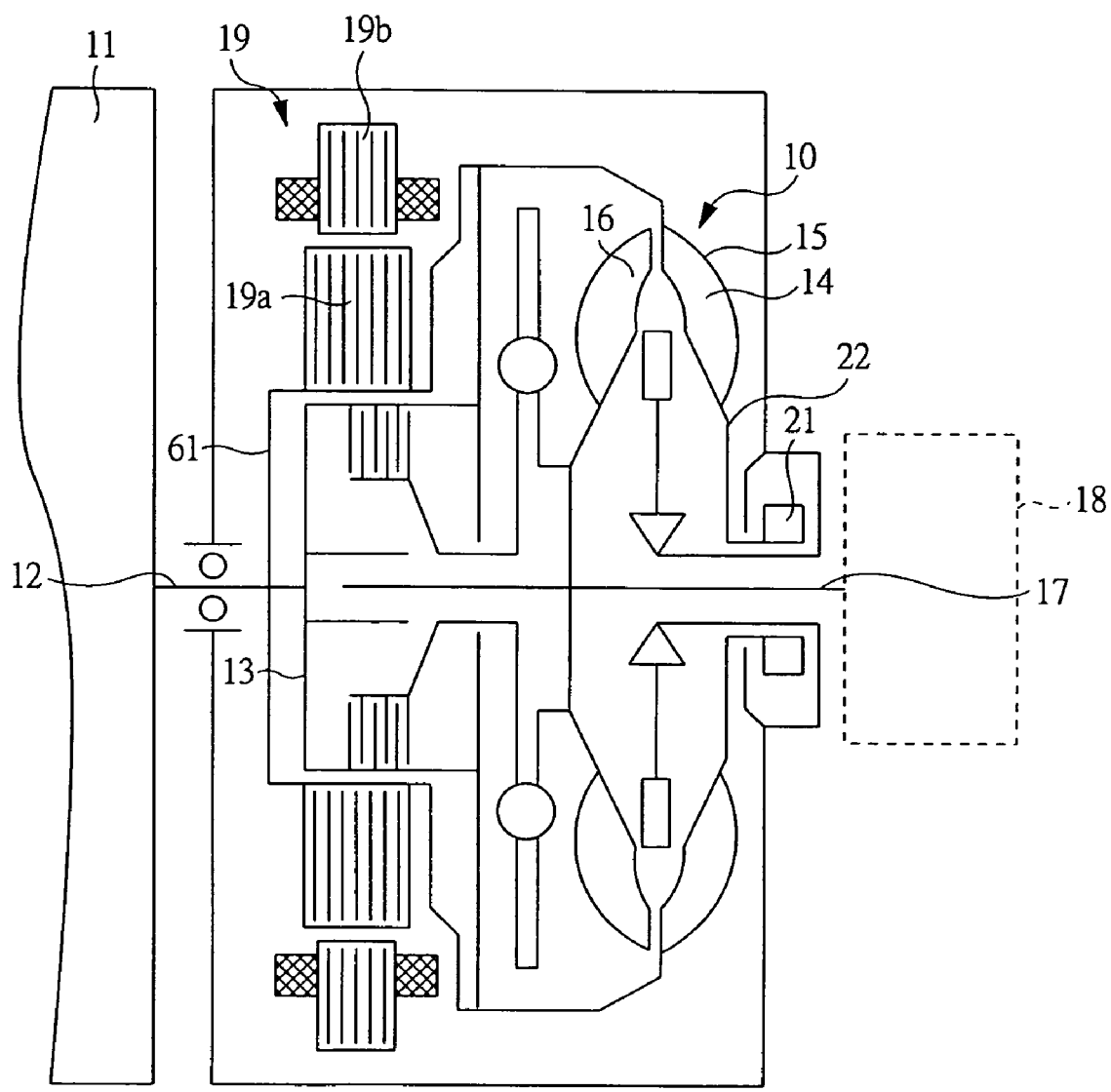
FIG. 1 is a schematic view showing an entire structure of the present invention.

FIG. 1 is a schematic view showing an entire structure of the present invention. As shown in FIG. 1, a torque converter 10 has a front cover 13 linked to an engine output shaft 12 serving as a crankshaft of an engine 11, and an impeller shell 15 provided with a pump impeller 14 is mounted to the front cover 13. A turbine runner 16 is arranged so as to be opposed to the pump impeller 14, and the turbine runner 16 is linked to a main shaft 17 serving as an output shaft of the torque converter 10. An engine output power is amplified by the torque converter 10 and the amplified engine output is transmitted to the main shaft 17. The main shaft 17 is linked to drive wheels (not shown) via a power transmission apparatus 18 having a transmission, and etc.

A power generating motor 19 is linked to the engine output shaft 12. The power generating motor 19 has a rotor 19a and a stator 19b, and can: assist a drive force by operating as an assist motor at a vehicle starting time or a vehicle accelerating time, at which a load is applied to the engine 11; charge a battery by operating as a power generator at a time of a low load of the engine 11; and make an energy generation at a controlled time or a time of running on a downhill round due to a regenerative braking.

An impeller hub 22, in which one end thereof is linked to the impeller shell 15 and the other end is connected to an oil pump 21, is arranged in an outer periphery of the main shaft 17 so as to be relatively rotatable with respect to the main shaft 17. The oil pump 21 for supplying the oil to the torque converter 10 is driven by rotation of the impeller hub 22.

Figure 2:
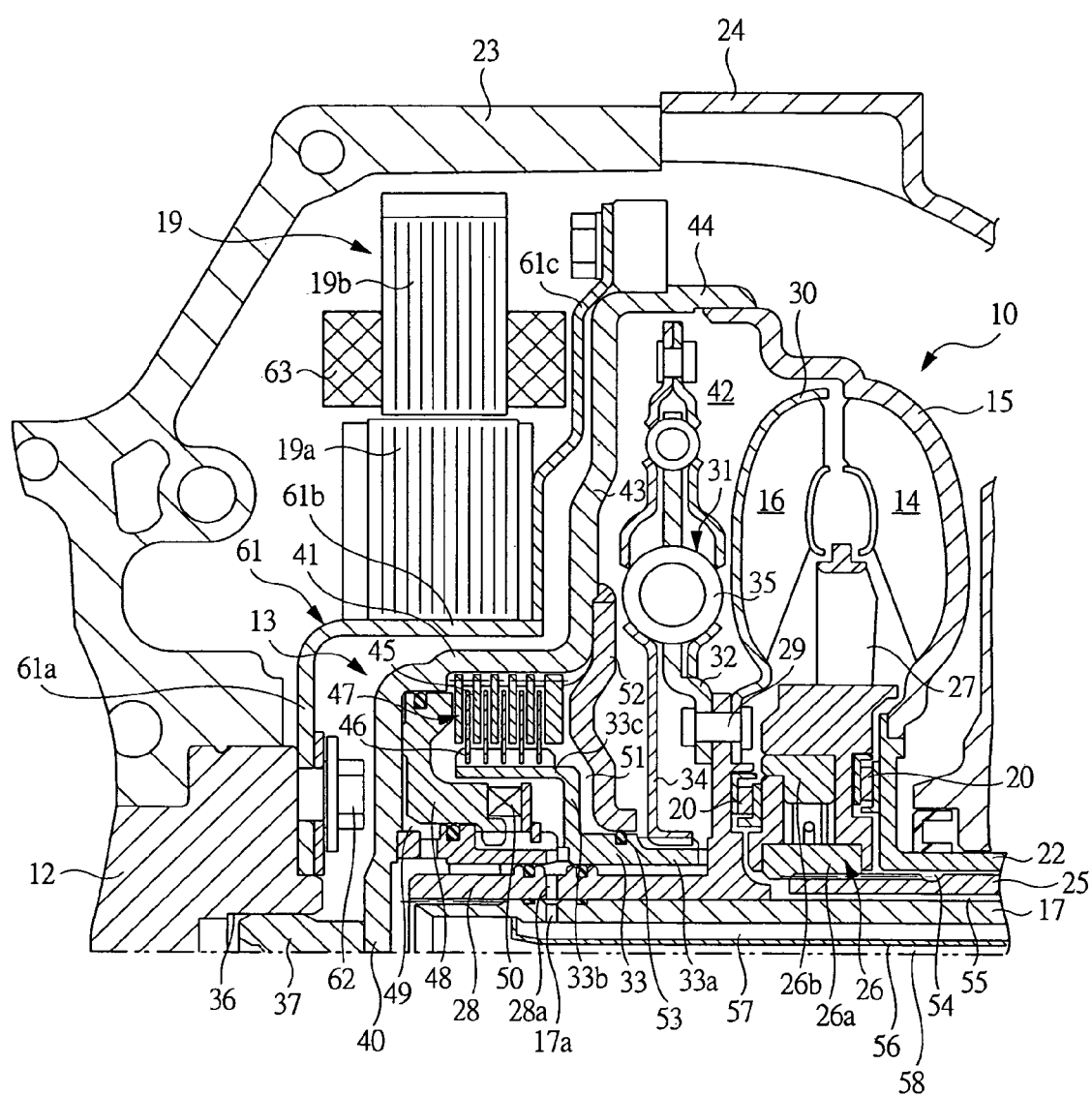
FIG. 2 is an enlarged sectional view of a main portion of a torque converter according to a first embodiment of the present invention.

FIG. 2 is an enlarged sectional view of a main portion of a torque converter 10 according to a first embodiment of the present invention. As shown in FIG. 2, a motor housing 23 pivotally supporting the engine output shaft 12 and accommodating the power generating motor 19 is assembled in a converter housing 24 pivotally supporting the main shaft 17 and accommodating the torque converter 10. A stator shaft 25 arranged between the main shaft 17 and the impeller hub 22 is fixed to the converter housing 24, and an inner race 26a of a one-way clutch 26 is spline-connected to the stator shaft 25, and a stator 27 is arranged in an outer race 26b of the one-way clutch 26.

A hollow turbine hub 28 is spline-connected to an outer periphery of an end of the main shaft 17, and the turbine hub 28 rotates integrally with the main shaft 17. A runner shell 30 of the turbine runner 16 and a spring seat 32 of a lockup damper 31 are linked to a flange portion of the turbine hub 28 by a rivet 29. Thrust bearings 20 are respectively arranged between the one-way clutch 26 and the impeller hub 22 and between the one-way clutch 26 and the flange portion of the turbine hub 28, and a torque transmitted to the runner shell 30 and the lockup damper 31 is transmitted to the main shaft 17 via the turbine hub 28.

The lockup damper 31 has: the spring seat 32 connected to the turbine hub 28; the spring seat 34 connected to a clutch hub 33; and a plurality of torsion springs 35 arranged in a circumferential direction and linked between the spring seats 32 and 34. The clutch hub 33 has a tube portion 33a fitted to the turbine hub 28, and the spring seat 34 is fixed to the tube portion 33a. Further, the clutch hub 33 has a disc portion 33b extending in a radially-outward direction from the tube portion 33a, and a drum portion 33c extending toward the engine output shaft 12 from the disc portion 33b.

The front cover 13 includes: an inner disc portion 40 to which a shaft portion 37 assembled in a hole 36 formed in the engine output shaft 12 is fixed; a tubular drum portion 41 extending axially from an outer peripheral portion of the inner disc portion 40 toward the pump impeller 14; and an outer disc portion 43 extending radially from the drum portion 41 and forming a converter chamber 42 along with the impeller shell 15, wherein a tip of the outer disc portion 43 is provided with an outer cylinder portion 44 extending toward the impeller shell 15 and linked to the impeller shell 15. Accordingly, the engine output is transmitted to the impeller shell 15 via the front cover 13 by driving the engine 11.

The drum portion 41 of the front cover 13 is opposed to the drum portion 33c of the clutch hub 33, and a plurality of drive plates 45 arranged inside the drum portion 41 and a plurality of driven plates 46 arranged outside the drum portion 33c are alternately laminated, so that a lockup clutch 47 is constituted by the plates 45 and 46. A lockup piston 48 is movably assembled axially between the lockup clutch 47 and the inner disc portion 40 of the front cover 13, whereby an engagement oil chamber 49 is formed between the lockup piston 48 and the inner disc portion 40. A spring member 50 is attached to the lockup piston 48, so that a spring force always pushes the lockup piston 48 toward the inner disc portion 40 by the spring member 50. However, if the oil is supplied to the engagement oil chamber 49, the lockup piston 48 is operated in a direction of pressing the lockup clutch 47 due to the hydraulic pressure of the oil.

The outer disc portion 43 of the front cover 13 is provided with a partition wall 52 for sectioning the clutch chamber 51 accommodating the lockup clutch 47 and the converter chamber 42. A radially and outwardly extended portion of the partition wall 52 is fixed to an inner wall of the outer disc portion 43, and a radially and inwardly extended portion thereof contacts with a seal member 53 attached to the clutch hub 33, whereby the clutch chamber 51 has such a structure as to be isolated from the converter chamber 42.

In the converter chamber 42, a converter oil passage 54 formed between the impeller hub 22 and the stator shaft 25, and a converter oil passage 55 formed between the stator shaft 25 and the main shaft 17 communicate with each other, so that a supply/discharge path of the oil to/from the converter chamber 42 is constituted by these two converter oil passages 54 and 55. A flow passage 56 is assembled so as to extend axially into a hollow hole of the main shaft 17, and a lubricating oil passage 57 is formed within the main shaft 17 by the flow passage 56, and the lubricating oil passage 57 communicates with the clutch chamber 51 via communication holes 17a and 28a formed respectively in the main shaft 17 and the turbine hub 28. Further, a lockup oil passage 58 formed inside the passage 56 communicates with the engagement oil chamber 49. The lubricating oil supplied to the plates 45 and 46 of the lockup clutch 47 from the lubricating oil passage 57 is applied in such a direction as to cancel out centrifugal hydraulic pressure caused by the oil within the engagement oil chamber 49, whereby it is possible to prevent the centrifugal hydraulic pressure occurring in accordance with the rotation of the torque converter 10.

The oil supplied to the converter chamber 42 is used as a torque transmission medium, as well as lubricates and cools down members within the converter chamber 42, but is prevented from flowing into the clutch chamber 51 by the partition wall 52. Accordingly, the lockup clutch 47 can be actuated without supplying a high pressure to the engagement oil chamber 49.

In the case shown in FIG. 2, since the lockup clutch 47 is constituted by a wet-type small-diameter multiple disc clutch and a radial dimension thereof is shortened, a space can be ensured in an outer periphery of the drum portion 41 of the front cover 13 and the power generating motor 19 can be attached to the space.

A rotor supporting member 61 is fixed to the engine output shaft 12. The rotor supporting member 61 comprises a disc portion 61a fastened to the engine output shaft 12 by a bolt 62, a cylinder portion 61b extending along the drum portion 41 of the front cover 13, and a disc portion 61c extending along the outer disc portion 43 of the front cover 13, wherein the disc portion 61c is fastened to the outer cylinder portion 44 of the front cover 13. Accordingly, the rotor supporting member 61 and the front cover 13 are integrally rotated by the engine output shaft 12.

The rotor 19a having permanent magnets is fixed to the cylinder portion 61b, and the stator 19b around which a coil 63 is wound is fixed to an inner wall surface of the motor housing 23 so as to form a predetermined gap between the rotor 19a and the stator 19b. In the case shown in the FIG. 2, the power generating motor 19 is set to have an axial dimension approximately equal to the axial dimension of the drum portion 41, and the lockup clutch 47 and the power generating motor 19 are arranged axially at almost the same position and provided respectively on radial inside and outside positions. Therefore, the axial dimension of the power transmission apparatus can be reduced. Further, since the multiple disc clutch is formed by the drive plate 45 and the driven plate 46 that constitute the lockup clutch 47, the sufficient pressure receiving area can be ensured. Therefore, it is possible to attain an increase of a power transmission capacity and transmit the torque of the engine 11 and that of the power generating motor 19 with a good controllability.

Next, a description will be made of a torque transmission state of the torque converter 10 according to the present invention. The engine output of the engine output shaft 12 is transmitted to the front cover 13 via the shaft portion 37 and the rotor supporting member 61. When the power generating motor 19 is actuated as an assist motor, the motor torque is transmitted as an auxiliary torque of the engine output to the front cover 13 via the rotor supporting member 61. The torque transmitted to the front cover 13 is further transmitted to the impeller shell 15, and the oil with which the converter chamber 42 is filled circulates between the turbine runner 16 and the pump impeller 14 via the stator 27 by the rotation of the pump impeller 14, thereby rotating the turbine runner 16. Next, the rotation of the turbine runner 16 is transmitted to the main shaft 17 via the turbine hub 28. At this time, if a torque amplifying effect is generated between the pump impeller 14 and the turbine runner 16, the reaction force depending on the torque amplifying effect is applied to the stator 27 and the stator 27 is prevented from rotating by the one-way clutch 26. Further, the oil pump 21 is driven by the torque transmitted to the impeller hub 22 connected to the impeller shell 15.

If a speed ratio of the torque converter 10 gets close to 1 as the rotational speed of the engine increases, the torque amplifying effect is not generated between the pump impeller 14 and the turbine runner 16. At this time, in order to avoid a power transmission loss due to an oil slip, the lockup clutch 47 is engaged so that the engine output is directly transmitted to the main shaft 17.

The lockup clutch 47 is engaged by pressing the lockup piston 48 based on the hydraulic pressure of the oil supplied to the engagement oil chamber 49 and by engaging the drive plate 45 and the driven plate 46 with each other. As mentioned above, since the clutch chamber 51 and the converter chamber 42 are partitioned structurally, it is possible to engage the drive plate 45 and the driven plate 46 without being affected by the hydraulic pressure of the oil supplied to the converter chamber 42. Therefore, if both plates are completely engaged, the front cover 13 and the clutch hub 33 become integrally rotated. For this reason, the torque of the engine output shaft 12 is transmitted to the clutch hub 33 from the front cover 13 via the lockup clutch 47, and is next transmitted to the main shaft 17 from the lockup damper 31 via the turbine hub 28, whereby the power transmission loss can be avoided between the pump impeller 14 and the turbine runner 16. Fluctuations of the engine torque can be absorbed by the lockup damper 31. Note that the drive plate 45 and the driven plate 46 may be engaged in the slip state in accordance with the drive conditions.

Figure 3:
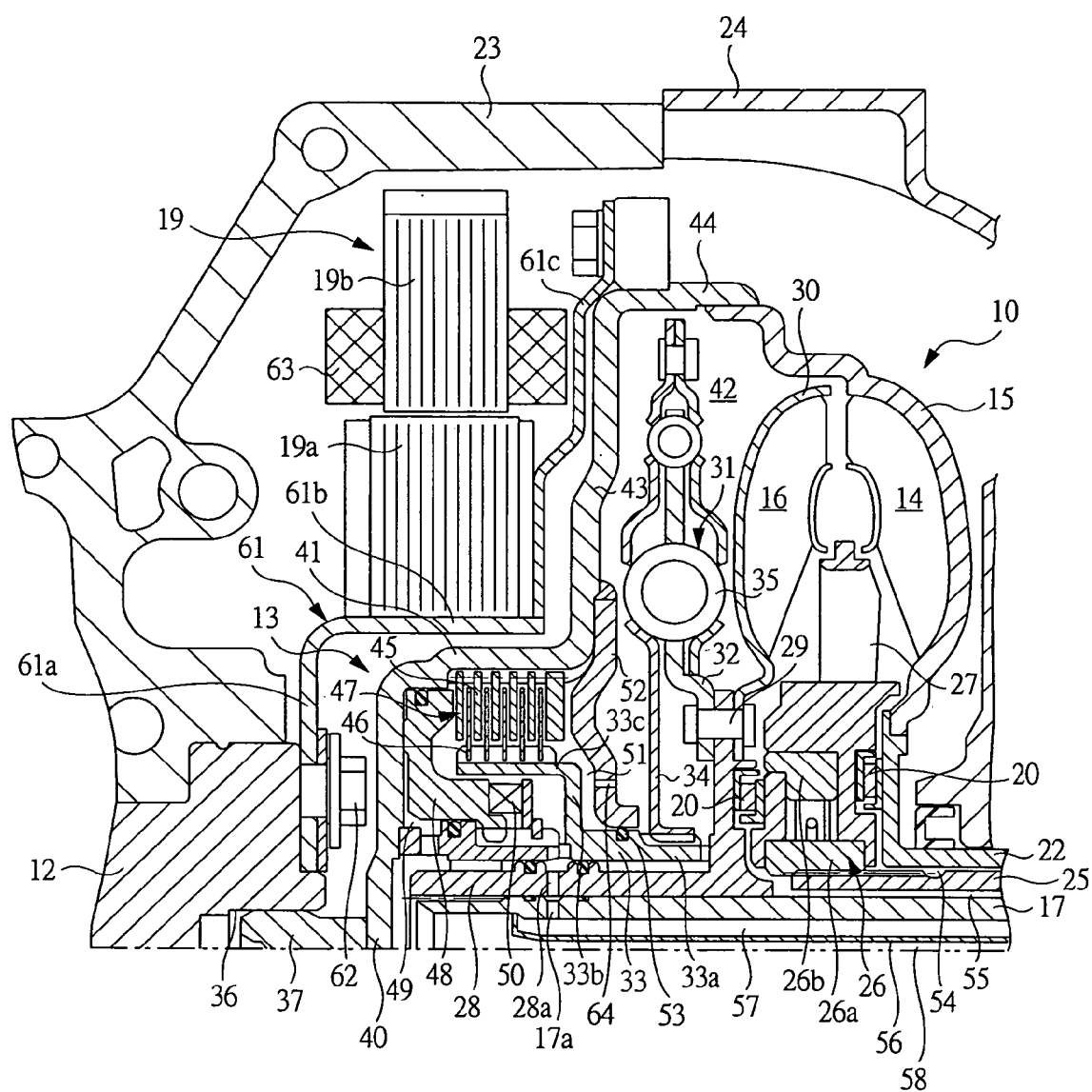
FIG. 3 is the enlarged sectional view of the main portion according to a second embodiment of the present invention.

FIG. 3 is an enlarged sectional view of a main portion of the torque converter according to a second embodiment of the present invention. The same member as those shown in FIG. 2 is denoted by the same reference numerals. As shown in FIG. 3, an orifice 64 having a micro diameter and communicating with the clutch chamber 51 and the converter chamber 42 is formed in the partition wall 52 separating the clutch chamber 51 from the converter chamber 42. Since the orifice 64 as well as the lubricating oil passage 57 communicates with the above-mentioned chambers, it is possible to enhance the circularity of the oil in the clutch chamber 51 and to efficiently lubricate and cool the inside of the clutch chamber 51. Since the oil flowing through the orifice 64 is depressurized, it does not influence the engagement hydraulic pressure of the lockup clutch 47.

Figure 4:
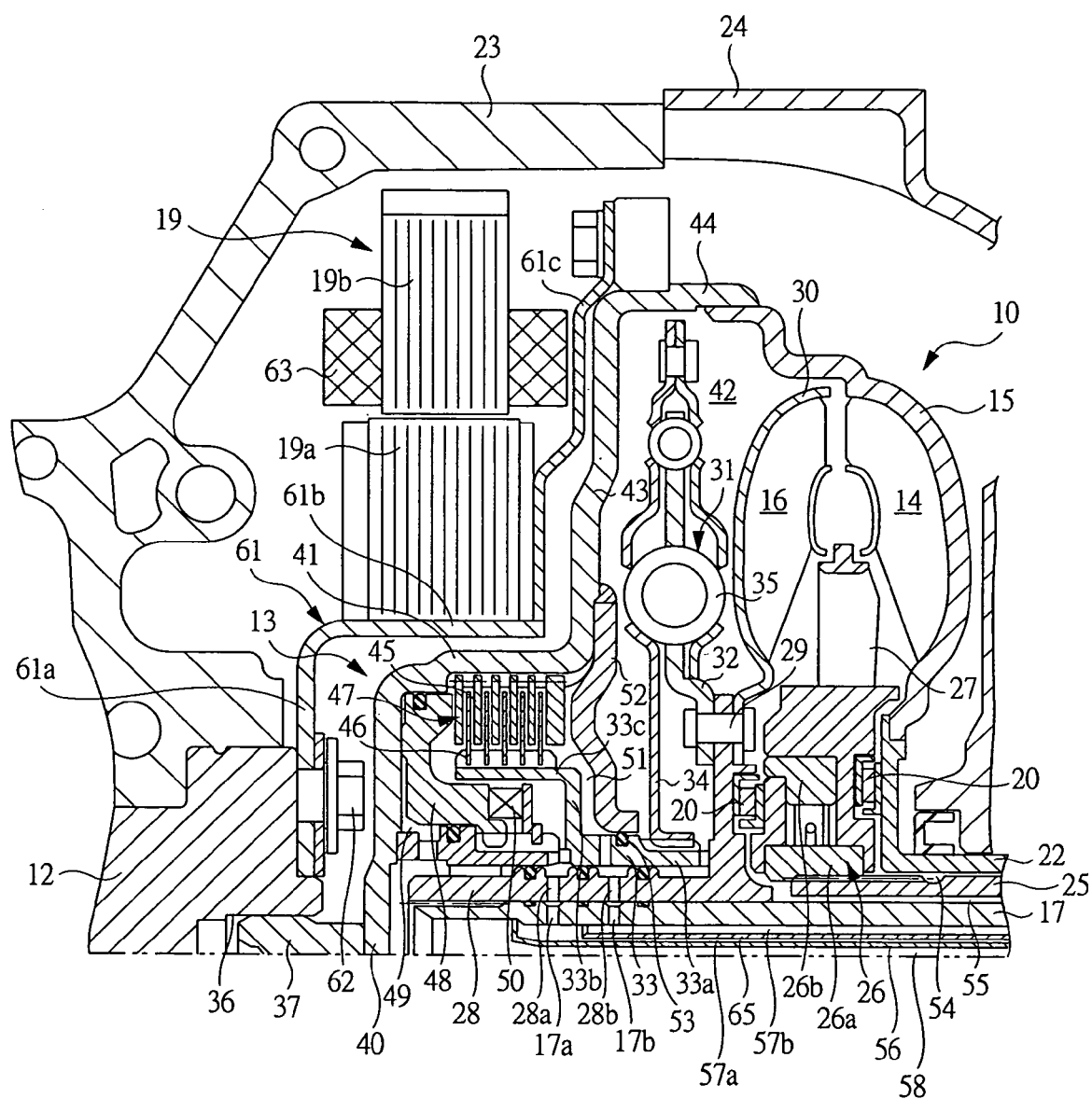
FIG. 4 is the enlarged sectional view of the main portion according to a third embodiment.

FIG. 4 is an enlarged sectional view of the main portion of the torque converter according to a third embodiment of the present invention. The same member as those shown in FIG. 2 is denoted by the same reference numeral. As shown in FIG. 4, another flow passage forming member 65 is assembled outside the flow passage forming member 56 so that one end thereof is fixed to the inner peripheral surface of the main shaft 17 and extends axially. The lubricating oil passage 57 is formed so as to be divided into a first lubricating oil passage 57a and a second lubricating oil passage 57b. The first lubricating oil passage 57a communicates with the inside of the drum portion 33c in the clutch chamber 51 via the communication holes 17a and 28a, and the second lubricating oil passage 57b communicates with the outside of the drum portion 33c in the clutch chamber 51 via the communication holes 17b and 28b. As mentioned above, the two lubricating oil passages 57a and 57b are provided in the main shaft 17 so as to communicate with the clutch chamber 51, wherein one of the passages 57a, 57b is used as an oil supply passage and the other is used as an oil discharge passage. Therefore, it is possible to enhance the circularity of the oil in the clutch chamber 51 in comparison with the embodiment shown in FIG. 2 and to more efficiently lubricate and cool the inside of the clutch chamber 51.

Figure 5:
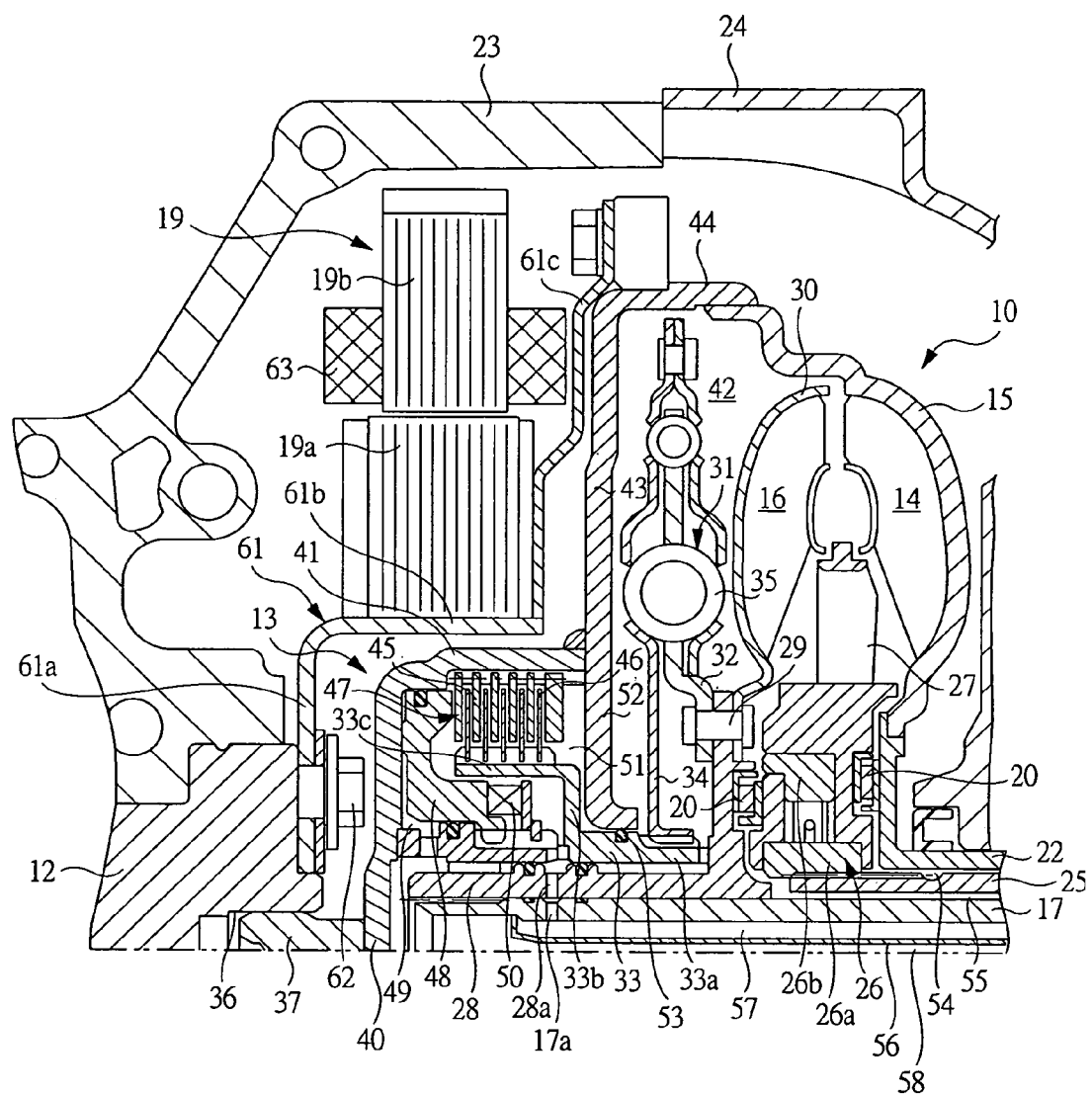
FIG. 5 is the enlarged sectional view of the main portion according to a fourth embodiment.

FIG. 5 is an enlarged sectional view of the main portion of the torque converter according to a fourth embodiment of the present invention. The same member as those shown in FIG. 2 is denoted by the same reference numeral. As shown in FIG. 5, the partition wall 52 sectioning the clutch chamber 51 and the converter chamber 42 is formed by folding a sheet material together with the outer disc portion 43 and the outer cylinder portion 44 of the front cover 13, and these elements are formed by one member. Further, the inner disc portion 40 and the drum portion 41 are formed by folding the sheet material, and the front cover 13 provided with the partition wall 52 is formed by welding two members. In this case, the member constituting the lockup clutch 47 is previously incorporated into two members before being welded. If a module is constituted by the lockup clutch 47, and the inner disc portion 40 and the drum portion 41 of the front cover 13 accommodating the lockup clutch 47, the lockup clutch 47 can be assembled at a time of manufacturing the front cover 13. Thus, since an external mounting structure is formed by modularizing the lockup clutch 47 and a portion of the front cover 13, an outward protruding amount of the torque converter 10 can be easily changed, for example, in accordance with the number of the drive plate 45 and the driven plate 46 to be used.

The present invention is not limited to the above embodiments, and can be variously modified and altered without departing from the gist thereof. For example, the lockup clutch 47 as mentioned above has been constituted by a multiple disc clutch, but may be constituted by a single disc clutch. In the illustrated embodiments, the structure is made such that the power generating motor 19 is attached to the outside of the drum portion 41 of the front cover 13 and the torque converter 10 is mounted on the hybrid vehicle. However, the torque converter of the present invention may be applied to the vehicle to which the power generating motor 19 is not attached.

The entire disclosure of a Japanese Patent Application No. 2003-420502, filed on Dec. 18, 2003 including specification, claims, drawings and summary, on which the Convention priority of the present application is based, is incorporated herein by reference in its entirety.

What is claimed is:

1. A torque converter having an impeller shell provided with a pump impeller and driven by an engine output shaft, and a turbine runner linked to a hollow main shaft so as to be opposed to said pump impeller, the torque converter comprising:
   a front cover with an inner disc portion, a tubular drum portion extending axially from said inner disc portion toward said pump impeller, and an outer disc portion extending radially from said drum portion and forming a converter chamber along with said impeller shell;
   a clutch hub connected to said main shaft with a driven plate engaged and a drive plate attached to said drum portion is attached;
   a lockup piston movably attached axially to an inside of said drum portion and forming an engagement oil chamber along with said inner disc portion; and
   a partition wall provided in said outer disc portion and sectioning said converter chamber and a clutch chamber for accommodating said drive plate and said driven plate.

2. The torque converter according to claim 1, further comprising:
   a lubricating oil passage communicating with said clutch chamber and a lockup oil passage communicating with said engagement oil chamber.

3. The torque converter according to claim 1, further comprising:
   an orifice communicating with said clutch chamber and said converter chamber is formed in said partition wall.

4. The torque converter according to claim 1, further comprising:
   an oil supply passage supplying lubricating oil to said clutch chamber; and
   a discharge passage discharging the lubricating oil within the clutch chamber.

5. The torque converter according to claim 1, wherein:
   said front cover is formed by welding a first member forming said partition wall and said outer disc portion, and a second member forming said inner disc portion and said drum portion.

6. The torque converter according to claim 1, further comprising:
   an electric motor with a rotor linked by said engine output shaft.

7. The torque converter according to claim 2, further comprising:
   an orifice communicating with said clutch chamber and said converter chamber is formed in said partition wall.

8. The torque converter according to claim 2, further comprising:
   an oil supply passage supplying lubricating oil to said clutch chamber; and
   a discharge passage discharging the lubricating oil within the clutch chamber.

* * * * *